Oct. 27, 1970   J. W. DAVIS   3,536,341
VEHICLE ANTI-SKID BRAKING SYSTEMS
Filed Oct. 25, 1968   2 Sheets-Sheet 2

United States Patent Office 3,536,341
Patented Oct. 27, 1970

3,536,341
VEHICLE ANTI-SKID BRAKING SYSTEMS
John Walter Davis, Coventry, England, assignor to The Dunlop Company Limited, London and Birmingham, England, a corporation of Great Britain
Filed Oct. 25, 1968, Ser. No. 770,710
Claims priority, application Great Britain, Oct. 31, 1967, 49,341/67
Int. Cl. B62d 53/08
U.S. Cl. 280—432          23 Claims

ABSTRACT OF THE DISCLOSURE

Anti-jack knifing system for articulated vehicle comprising two skid sensing means coupled respectively to the rear wheels of the trailer portion of the vehicle and the rear wheels of the tractor portion of the vehicle and arranged to actuate a brake arranged co-axially with the king pin to prevent pivotting of the tractor relative to the trailer.

---

This invention relates to vehicle anti-skid braking systems and particularly to anti-jack knifing systems for articulated vehicles in which a skid may lead to jack-knifing of a tractor portion of the vehicle relative to a trailer portion of the vehicle.

It is known that jack-knifing may be restrained in an articulated vehicle by limiting the freedom of movement of a tractor portion of the vehicle relative to a trailer portion of the vehicle for example by a frictional arrangement about the axis of coupling (called the king-pin) of the portions of the vehicle or by hydraulic struts and by these means, although skids are not prevented, their effects may be minimized. These means become effective whenever the brakes are applied irrespective of the existence of skid conditions. However, this resistance to pivotting of the two portions of the vehicle about the king-pin may be disadvantageous in increasing the steering effort needed and creating under-steer.

The object of the present invention is to provide an improved anti-jack knifing system.

According to the present invention an anti-jack knifing system for an articulated vehicle comprises a device operable to restrict freedom of pivotting of a tractor portion of the vehicle relative to a trailer portion of the vehicle, and a skid-sensing means responsive to a change in rate of rotation of an associated wheel of the vehicle and arranged to actuate the device, the device being operable only when actuated by the skid-sensing means.

The device may be a brake operable between the two vehicle portions and arranged co-axially with the king-pin, and is conveniently a fluid-pressure operated brake, preferably pneumatically operated.

Jack-knifing may be caused by skidding of the tractor rear wheels and pivotting of the tractor or by skidding of the trailer wheels and pivotting of the trailer. Accordingly the skid-sensing means may be arranged to sense an incipient skid developing at the rear wheels of the tractor and/or any of the trailer wheels. The means may be of any convenient type, for example sensing deceleration of a wheel or wheels or of a driving propellor shaft beyond a predetermined rate of deceleration which is normally only barely attainable, or is unattainable, by braking without skids. The means may operate mechanically, electrically or otherwise.

In one embodiment of the invention the skid sensing means comprises a first mechanism arranged to actuate the said device when the rate of rotation of the associated wheel is below a predetermined value, and a second mechanism arranged to prevent actuation of the device when the vehicle speed is below a predetermined value.

In a second embodiment of the invention the skid sensing means comprises a fly wheel rotatable around a shaft driven at a speed proportional to the speed of rotation of an associated wheel, the fly wheel being frictionally driven by the shaft and being arranged so as to be axially displaced relative to the shaft when the rate of rotation of the fly wheel is greater than the rate of rotation of the shaft, said axial displacement of the fly wheel causing axial displacement of a control element to effect operation of said device.

Two embodiments of the invention will now be described by way of example with reference to the accompanying drawings in which.

Figure 1:
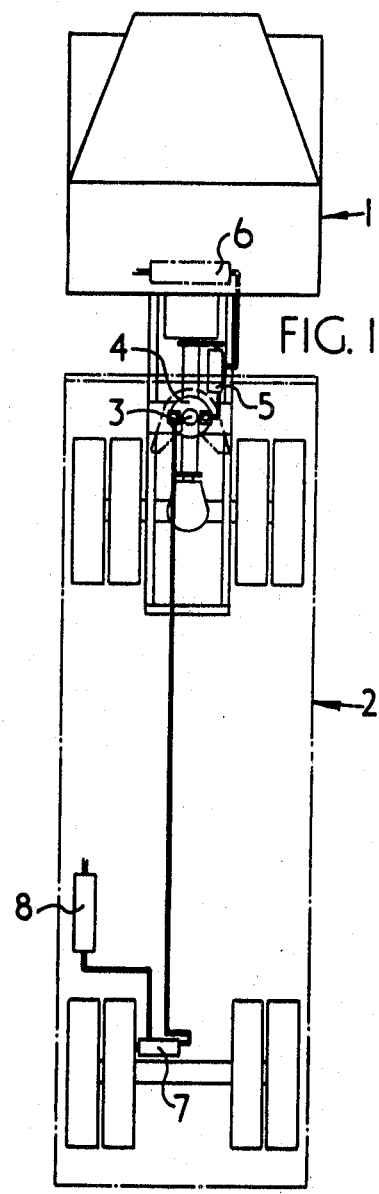
FIG. 1 is a diagrammatic plan view of an articulated vehicle incorporating an anti-jack knifing system according to the invention.

FIG. 1 shows an articulated vehicle having a tractor portion 1 and a trailer portion 2 linked together so that they can pivot about a king-pin 3.

A pneumatically operated brake 4 is arranged co-axially with the king-pin 3 and when actuated operates as a device to restrict freedom of pivotting of the tractor relative to the trailer about the king-pin 3.

A skid-sensing means 5 is coupled to the propellor shaft of the tractor portion, and is arranged between the king-pin brake 4 and a reservoir 6 of air pressurised by an engine driven compressor (not shown).

A second skid-sensing means 7 is coupled to the back wheels of the trailer and is arranged between the king-pin brake and a reservoir 8 of pressurised air.

When an incipent skid develops at either the rear wheels of the trailer or the rear wheels of the tractor the appropriate skid-sensing means operates to connect the king-pin brake to an air reservoir causing actuation of the king-pin brake.

Figure 2:
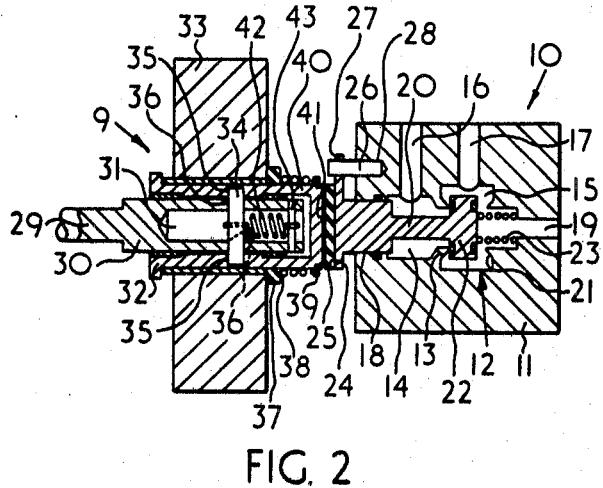
FIG. 2 is a diagrammatic axial cross-sectional view of a skid-sensing means and a control valve for use in the anti-jack knifing system shown in FIG. 1.

FIG. 2 shows one form of skid-sensing means 9 arranged to actuate a control valve 10 to allow flow of air to the king-pin brake 4.

The control valve 10 comprises a valve body 11 formed with an internal chamber 12 divided by an annular valve seat 13 into an inlet chamber 14 and an outlet chamber 15. An inlet passage 16 for connection to an air reservoir and an outlet passage 17 for connection to the king-pin brake 4 are formed in the valve body 11 and communicate respectively with the inlet and outlet chambers.

The valve body 11 is provided with two bores 18, 19 arranged co-axially with the valve seat 13. In one bore 18 a valve member 20 is guided for sliding movement. The other bore 19 constitutes an exhaust passage communicating with the outlet chamber 15, and is bounded by a valve seat 21 within the outlet chamber 15. The valve member 20 has an enlarged head 22 which is engageable with the two valve seats 13, 21. When the valve member 20 is displaced axially to the left as seen in FIG. 2 the head 22 engages the valve seat 13 to prevent flow of air from the inlet chamber 14 to the outlet chamber 15 and the valve seat 21 is uncovered to allow flow of air from the outlet chamber 15 to exhaust.

When the valve member 20 is displaced axially to the right the head 22 engages the valve seat 21 sealing the exhaust passage 19 and allowing flow of air from the inlet chamber 14 to the outlet chamber 15 and to the king-pin brake 4.

A spring 23 is provided within the outlet chamber 15 to urge the head 22 of the valve member 20 into engagement with the valve seat 13.

The valve member 20 extends axially beyond the valve body 11 from the bore 18 and terminates in a flat end face 24. A pad 25 of friction material is secured to the end face 24. The pad 25 is formed from a maerial having stable frictional characteristics of the kind having self-lubricating properties.

A pin 26 slidably engaging a hole 27 in the valve member and fitting within a bore 28 in the valve body is provided to prevent rotation of the valve member 20 while allowing its axial displacement.

The skid-sensing means 9 comprises a shaft 29 coupled to an associated wheel of the vehicle by a suitable arrangement of gears (not shown) so that the shaft 29 can be driven at a rate of rotation proportional to the rate of rotation of the wheel.

The shaft 29 has an enlarged end portion 30 provided with an axial bore 31. The end portion 30 of the shaft 29 is arranged adjacent to and co-axially with the valve member 20. The end portion 30 carries an axially displaceable control element 32 in the form of a sleeve and this in turn supports a flywheel 33 which is journalled to rotate on the sleeve 32.

The sleeve 32 and shaft end portion 30 are keyed together by a transverse pin 34 passed through aligned bores 35 in the sleeve 32 and through elongated slots 36 in the shaft end portion 30 and the slots 36 lie on helices co-axial with the shaft 29.

A ring 37 of friction material is mounted on and keyed to the sleeve 32 so as to be rotatable with and axially slidable relative to the sleeve 32. The friction ring 37 is urged against a face of the flywheel 33 by a spring 38 trapped between the ring 37 and an abutment washer 39 on the sleeve 32.

One end 40 of the sleeve 32 projects axially from the end portion 30 of the shaft and has a flat, radially extending face 41 arranged parallel and adjacent to the end face 24 of the valve member 20.

When the pin 34 lies in the end of the helical slots 36 remote from the valve 10, the face 40 of the sleeve 32 is spaced from the end face 24 of the valve member 20 by a gap. The arrangement of the helical slots 36 is such that in acceleration of the shaft end portion 30 the pin 34 is driven by the shaft and the sleeve 32 rotates with the shaft to maintain the gap. The flywheel 33 then rotates, substantially at the speed of the sleeve 32 and shaft 29.

During deceleration of the vehicle under braking the rate of rotation of the shaft 29 is reduced, the flywheel 33 rotates relative to the sleeve 32 due to inertia, and the pin 34 moves along the slots 36 so that the flywheel 33 and the sleeve 32 are displaced axially to the right, as seen in FIG. 2, tending to reduce or close the gap. The spring 23 in the valve 10 and frictional torque between the face 40 of the sleeve 32 and the end face 24 of the valve member 20 resist the axial displacement of the sleeve 32 and prevent the valve member 20 being displaced axially to open the valve unless the deceleration rate exceeds a predetermined value.

If the rate of deceleration of the vehicle is sufficiently great the difference between the rate of rotation of the flywheel 33 and the rate of rotation of the shaft 29 causes the sleeve 32 to be displaced axially with sufficient force to effect axial displacement of the valve member 20 to allow air to flow between the two chambers 14, 15 of the valve 10 and hence actuation of the king-pin brake 4. In such conditions the end face 24 of the valve member 20 frictionally engages the face 40 of the sleeve 32 to hold the two together and prevent the sleeve 32 returning due to for example vehicle vibrations. Only actual acceleration of the shaft 29 will return the sleeve 32 and allow closing of the valve. Hence the king-pin brake is held energised all the time the wheels are locked.

The spring 38 on the sleeve 32 has no effect on flywheel movement and merely acts to couple the flywheel 33 and sleeve 32. However, a coil spring 42 is provided in the shaft bore 31 acting in torsion between the pin 34 and a parallel cross pin 43 in the shaft end 30 to effect spring loading of the sleeve 32. This reduces wear on the friction surfaces during moderate decelerations in which the king-pin brake is not actuated.

Figure 3:
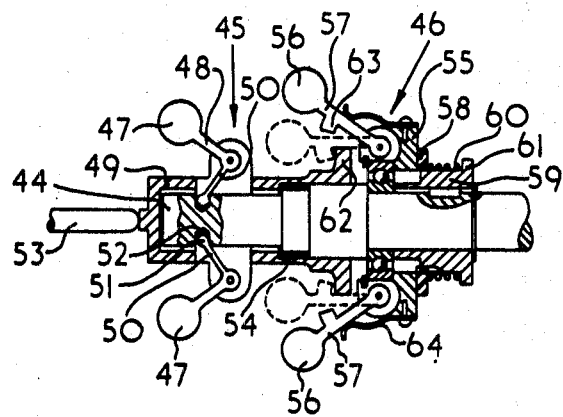
FIG. 3 is a diagrammatic axial cross-sectional view of an alternative form of skid-sensing means.

An alternative form of skid-sensing means shown in FIG. 3 comprises a shaft 44 coupled to an associated wheel of the vehicle. A first governor 45 and a second governor 46 are mounted on and co-axially with the shaft 44. The first governor 45 comprises a set of weights 47 arranged circumferentially around the shaft, each weight being secured to an arm 48 pivotally mounted on a control element 49 in the form of a sleeve slidably mounted on one end portion of the shaft 44. Each arm has a limb 50 projecting therefrom having a ball end 51 engaging a socket 52 formed in the shaft 44 for location of the sleeve 49 relative to the shaft 44.

As the shaft 44 rotates, the arms 48 pivot on the sleeve 49 and the weights 47 move radially away from the shaft 44 under centrifugal force and the arrangement of the limbs 50 causes axial displacement of the sleeve 49 to the right as seen in FIG. 3. As the rate of rotation of the shaft decreases the weights move radially towards the shaft and at a predetermined minimum rate of rotation collapse on to the shaft causing axial displacement of the sleeve to the left. A push rod 53 is arranged in contact with one end of the sleeve and is arranged to effect operation of a valve, which may be of similar form to that shown in FIG. 2, to allow flow of air to the king-pin brake when the first governor is in the collapsed state.

A spring 54 is arranged between the shaft 44 and the sleeve to urge the sleeve towards the left as seen in FIG. 3. The strength of the spring 54 determines the rate of rotation of the shaft at which the first governor collapses.

The second governor comprises a ring 55 journalled on the shaft and carrying a second set of weights 56 secured to arm 57 pivotally mounted on the ring. The governor ring 55 is frictionally driven by a friction ring 58 mounted on and keyed to a sleeve 59 mounted on the shaft. The friction ring 58 is urged against a face of the governor ring 55 by means of a spring 60 trapped between the friction ring 58 and an annular ridge 61 formed on the sleeve 59.

The end of the sleeve adjacent the second governor has an annular lip 62 formed thereon and each of the arms of the second governor has a latch 63 formed thereon so that when the second governor is in the collapsed state the latches engage the lip as indicated by dashed lines in FIG. 3 to prevent axial displacement of the sleeve on the shaft.

Leaf springs 64 are secured to the ring to urge the arms of the governor towards the shaft so that the second governor will collapse at a slightly higher rotational speed than the rotational speed at which the first governor collapses.

In operation, at low vehicle speeds, the second governor 46 remains collapsed and the first governor 45 is therefore latched and inoperative. Hence the valve is also inoperative and the king-pin brake is not actuated and this allows of low-speed maneuvering of the vehicle without hindrance.

When the vehicle is travelling at speeds at which skidding would be dangerous (above 10 m.p.h. for example) the rate of rotation of the shaft 44 is such that both governors are in fly-out position. Should the associated wheel or wheels lock the shaft 44 would slow suddenly to rest in the rotational sense and the first governor 45 would collapse to operate the valve and actuate the king-pin brake. At the same time the sudden slowing of the shaft 44 is not positively transmitted to the second governor 46. It runs on against the resistance of its frictional coupling to the shaft 44 due to its rotational inertia and slows more gradually. When it collapses the sleeve 49 is axially displaced and the latches 63 cannot engage the lip 62. The sleeve 49 thus remains in a position to operate the valve to cause actuation of the king-pin brake.

If on the other hand the shaft 44 slows to rest at the substantially uniform normal deceleration rate associated with a non-skid stop the second governor 46 slows with the shaft 44 under the influence of its frictional coupling. At a predetermined low speed the second governor 46 collapses and latches the sleeve 49 so stopping the first governor 45 from collapsing at a slightly lower speed. The king-pin brake is, therefore, not actuated in a stop in which skidding does not occur.

The first governor acts as a first mechanism arranged to actuate the king-pin brake when the rate of rotation of the shaft falls below a predetermined value and the second governor acts as a second mechanism arranged to prevent actuation of the brake when the vehicle speed falls below a predetermined value.

Although the two mechanisms are mechanical devices other suitable devices may be used for example electronic or electrical devices arranged to produce an electrical output having a value dependent upon the rate of rotation of the shaft.

In an articulated vehicle incorporating an anti-jack knifing system according to the invention the skid-sensing means may also be adapted to operate on the wheel brakes to reduce or prevent skids as well as on the king-pin coupling.

The specification of our co-pending U.K. patent application No. 49,342/67 describes a skid-sensing means of the kind shown in FIG. 3 of the present specification adapted to be used in a vehicle wheel anti-skid control system.

Having now described my invention, what I claim is:

1. An anti-jack knifing system for an articulated tractor-trailer vehicle including a king-pin coupling therebetween, said system comprising a brake disposed operable to restrict freedom of pivotting of the tractor relative to the trailer, and a skid-sensing means responsive to a change in rate of rotation of an associated wheel of the vehicle to sense an incipient skid and apply said brake, the brake being operable only when actuated by the skid-sensing means.

2. A system according to claim 1 wherein the device comprises a fluid pressure operated brake.

3. A system according to claim 2 wherein the skid-sensing means acts to control flow of fluid to the brake.

4. A system according to claim 1 wherein the skid-sensing means comprises a first mechanism arranged to actuate the said device when the rate of rotation of the associated wheel is below a predetermined value, and a second mechanism arranged to prevent actuation of the device when the vehicle speed is below a predetermined value.

5. A system according to claim 4 wherein the first mechanism comprises a set of weights arranged circumferentially around a shaft to provide a first governor, the shaft being driven at a rate of rotation proportional to the rate of rotation of an associated wheel and the weights being arranged so that they move radially away from the shaft under centrifugal force when the shaft rotates and collapse onto the shaft when the rate of rotation of the shaft falls below a certain minimum value, the governor being arranged to displace a control element to effect actuation of the device when the governor collapses.

6. A system according to claim 5 wherein each of the weights forming the first governor is secured to an arm pivotally associated with the shaft.

7. A system according to claim 6 wherein the said control element comprises a sleeve slidably mounted on the shaft.

8. A system according to claim 7 wherein the arm secured to each weight of the first governor is pivotally secured to the sleeve and the arm has a limb projecting therefrom having a ball end engaging a socket formed in the shaft for location of the sleeve relative to the shaft.

9. A system according to claim 5 wherein the second mechanism comprises a second governor formed from a set of weights mounted on a governor ring arranged on the shaft co-axially with the first governor, the governor ring being frictionally driven by the shaft and the governor being arranged so that in the collapsed position it prevents displacement of the said control element.

10. A system according to claim 9 wherein a friction ring is mounted on and keyed to the shaft so as to be rotatable with and axially slidable relative to the shaft, the friction ring being spring-urged axially into frictional engagement with the governor ring.

11. A system according to claim 9 wherein the control element comprises a sleeve slidably mounted on the shaft and the second governor engages the sleeve when in the collapsed position to prevent axial displacement of the sleeve relative to the shaft.

12. A system according to claim 11 wherein each of the weights forming the second governor is secured to an arm pivotally mounted on the governor ring, the end of the sleeve adjacent the second governor has an annular lip formed thereon and each of the arms of the governor has a latch formed thereon so that when the second governor is collapsed the latches engage the lip to prevent axial displacement of the sleeve.

13. A system according to claim 11 wherein the sleeve is spring-urged away from the second governor.

14. A system according to claim 9 wherein the second governor is spring-urged into the collapsed position.

15. A system comprising a skid-sensing means as claimed in claim 5 wherein said device comprises a fluid pressure operated brake and said displaceable control element is arranged to operate a control valve to control flow of fluid to the brake.

16. A system according to claim 1 wherein the skid-sensing means comprises a flywheel rotatable around a shaft driven at a speed proportional to the speed of rotation of an associated wheel, the flywheel being frictionally driven by the shaft and being arranged so as to be axially displaced relative to the shaft when the rate of rotation of the flywheel is greater than the rate of rotation of the shaft, said axial displacement of the flywheel causing axial displacement of a control element to effect operation of said device.

17. A system according to claim 16 wherein said control element comprises a sleeve mounted on said shaft between the flywheel and the shaft, the sleeve being keyed to the shaft by means of a pin passing through aligned bores in the sleeve and through helical slots in the shaft arranged so that when the rate of rotation of the sleeve is less than the rate of rotation of the shaft the pin moves in the helical slots so as to cause axial displacement of the sleeve.

18. A system according to claim 17 wherein a friction ring is mounted on and keyed to the outer periphery of the sleeve so as to be rotatable with and axially slidable relative to the sleeve, the friction ring being spring-urged axially into frictional engagement with the flywheel.

19. A system according to claim 17 wherein the sleeve is mounted on an end portion of the shaft and one end of the sleeve projects axially from the end of the shaft, the said end of the shaft having a radially extending face for frictional engagement with the end face of an axially movable non-rotatably mounted member, the arrangement being such that axial displacement of the sleeve brings the said face of the sleeve into frictional engagement with the end face of the member to effect axial displacement of the member.

20. A system according to claim 19 wherein a pad of friction material is secured to the end face of the member.

21. A system according to claim 19 wherein said device comprises a fluid pressure operated brake and said member constitutes a valve member slidable within a valve body to control flow of fluid to the brake.

22. An articulated vehicle according to claim 1 wherein said brake comprises a fluid pressure operated brake arranged co-axially with the king-pin.

23. An articulated vehicle according to claim 21 wherein two skid-sensing means are coupled respectively to the back wheels of the trailer and to the back wheels of the tractor and both skid-sensing means are arranged to be capable of actuating the device.

References Cited
UNITED STATES PATENTS

| | | | |
|---|---|---|---|
| 2,772,904 | 12/1956 | Doolittle | 291—2 |
| 3,260,556 | 7/1966 | Packer. | |
| 3,334,711 | 8/1967 | Anderson | 188—86 |
| 3,379,288 | 4/1968 | Davis. | |
| 3,411,835 | 11/1968 | Davis. | |
| 3,414,336 | 12/1968 | Atkin et al. | |
| 3,433,535 | 3/1969 | Horvath. | |

LEO FRIAGLIA, Primary Examiner

U.S. Cl. X.R.
188—181; 303—21